(12) United States Patent
 Sanborn et al.

(10) Patent No.: US 10,875,367 B2
(45) Date of Patent: Dec. 29, 2020

(54) ALL-WHEEL DRIVE LINE LOCK FOR WARMING TIRES DURING TRACK USAGE

(71) Applicant: Ford Global Technologies, LLC, Dearborn, MI (US)

(72) Inventors: Ethan D. Sanborn, Saline, MI (US); James Fritz, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 15/898,783

(22) Filed: Feb. 19, 2018

(65) Prior Publication Data

US 2019/0255895 A1 Aug. 22, 2019

(51) Int. Cl.

| | |
|---|---|
| *B60C 99/00* | (2006.01) |
| *B60T 13/66* | (2006.01) |
| *B60T 13/68* | (2006.01) |
| *B60T 8/175* | (2006.01) |
| *B60W 10/188* | (2012.01) |
| *B60W 10/192* | (2012.01) |
| *B60T 8/26* | (2006.01) |
| *B60T 8/1766* | (2006.01) |
| *B60T 8/1769* | (2006.01) |
| *B60C 11/03* | (2006.01) |
| *B60T 7/12* | (2006.01) |
| *B60T 8/32* | (2006.01) |

(52) U.S. Cl.
 CPC ........ *B60C 99/003* (2013.01); *B60C 11/0311* (2013.01); *B60T 7/12* (2013.01); *B60T 8/175* (2013.01); *B60T 8/1766* (2013.01); *B60T 8/1769* (2013.01); *B60T 8/26* (2013.01); *B60T 13/662* (2013.01); *B60T 13/686* (2013.01); *B60W 10/188* (2013.01); *B60W 10/192* (2013.01); *B60T 8/3205* (2013.01); *B60T 2201/14* (2013.01); *B60T 2240/02* (2013.01); *B60T 2270/89* (2013.01)

(58) Field of Classification Search
 CPC . B60C 99/003; B60C 11/0311; B60T 8/1769; B60T 7/12; B60T 13/662; B60T 13/686; B60T 8/175; B60T 8/26; B60T 8/1766; B60T 8/3205; B60T 2201/14; B60T 2240/02; B60T 2270/89; B60W 10/188; B60W 10/192
 USPC .......................................................... 701/48
 See application file for complete search history.

(56) References Cited

U.S. PATENT DOCUMENTS

| | | | | |
|---|---|---|---|---|
| 5,722,293 | A * | 3/1998 | McFadden | ............... F16H 59/04 477/80 |
| 6,406,103 | B1 * | 6/2002 | Elliott | ....................... B60T 1/02 303/20 |
| 8,297,717 | B2 | 10/2012 | Mlynarczyk et al. | |
| 9,174,616 | B2 * | 11/2015 | Taylor | ................... B60T 13/662 |

(Continued)

*Primary Examiner* — Aaron L Troost
*Assistant Examiner* — Mohamed Abdo Algehaim
(74) *Attorney, Agent, or Firm* — Vincent Mastrogiacomo; Brooks Kushman P.C.

(57) ABSTRACT

A vehicle includes a powerplant, such as an engine, configured to power front and rear wheels, and a controller. The controller is programmed to, brake a first of the front wheels and a first of the rear wheels while powering a second of the front wheels and a second of the rear wheels to warm those tires, and subsequently brake the second front wheel and the second rear wheel while powering the first front wheel and the first rear wheel to warm those tires.

11 Claims, 6 Drawing Sheets

(56) References Cited

U.S. PATENT DOCUMENTS

| | | | |
|---|---|---|---|
| 9,731,721 B1 | 8/2017 | Wilder et al. | |
| 9,764,609 B2 * | 9/2017 | Handzel, Jr. | B60C 99/003 |
| 2009/0112437 A1 * | 4/2009 | Luehrsen | B60T 8/175 |
| | | | 701/84 |
| 2011/0175438 A1 * | 7/2011 | Mlynarczyk | B60T 8/175 |
| | | | 303/20 |
| 2011/0175439 A1 * | 7/2011 | Mlynarczyk | B60T 8/175 |
| | | | 303/20 |
| 2013/0192814 A1 * | 8/2013 | Okubo | B60C 99/003 |
| | | | 165/287 |
| 2014/0129107 A1 * | 5/2014 | Taylor | B60T 13/662 |
| | | | 701/70 |
| 2015/0175009 A1 * | 6/2015 | Beever | B60K 7/0007 |
| | | | 701/22 |
| 2016/0368335 A1 * | 12/2016 | Christen | B60C 99/003 |
| 2017/0001646 A1 * | 1/2017 | Cooke | B60W 30/18172 |
| 2017/0096140 A1 * | 4/2017 | Woodley | B60W 30/143 |
| 2017/0190228 A1 * | 7/2017 | Handzel, Jr. | B60W 30/02 |
| 2018/0345973 A1 * | 12/2018 | Krueger | B60W 10/06 |

* cited by examiner

ALL-WHEEL DRIVE LINE LOCK FOR WARMING TIRES DURING TRACK USAGE

TECHNICAL FIELD

The present disclosure relates to systems and methods for tire warming all-wheel-drive vehicles to improve performance.

BACKGROUND

Tire performance can typically be improved by warming up the tires prior to racing. Drag racers, for example, preform controlled spinning ("burnout") of the rear, driven wheels prior to their run. Some vehicle now come equipped with tire-warmup systems configured to provide controlled spinning of the rear, driven wheels by locking the front brakes only and allowing the rear wheels to freely spin and warmup.

While these systems are satisfactory for rear-wheel drive vehicles, they are not suitable for use with all-wheel-drive vehicles. This disclosure presents systems and methods for warming up all driven tires of an all-wheel-drive vehicle.

SUMMARY

According to one embodiment, a vehicle includes a powerplant, such as an engine, configured to power front and rear wheels, and a controller. The controller is programmed to, brake a first of the front wheels and a first of the rear wheels while powering a second of the front wheels and a second of the rear wheels to warm those tires, and subsequently brake the second front wheel and the second rear wheel while powering the first front wheel and the first rear wheel to warm those tires.

According to another embodiment, a vehicle includes a powerplant, front and rear wheels, and a drivetrain arranged to selectively route power from the powerplant to the front and rear wheels. A vehicle controller is programmed to, responsive to line-lock mode being activated, (i) for a first time window, brake the front wheels and actuate the drivetrain to disconnect the front wheels from the powerplant and to drivably connect the rear wheels with the powerplant, and (ii) for a second time window that is adjacent to the first time window, brake the rear wheels and actuate the drivetrain to disconnect the rear wheels from the powerplant and to drivably connect the front wheels with the powerplant.

According to yet another embodiment, a vehicle includes wheel assemblies each having a wheel, an electric machine, and a brake. A controller is programmed to, responsive to line-lock mode being activated, (i) during a first phase, apply the brake of a first of the wheel assemblies and energize the electric machine of a second of the wheel assemblies, and (ii) during a second phase, apply the brake of the second wheel assembly and energize the electric machine of the first wheel assembly.

According to a further embodiment, a vehicle includes a powerplant configured to power front and rear axles that each includes a pair of wheels. The vehicle further includes a controller programmed to, brake a first wheel of one of the axles while powering a second wheel of the same axle. The controller may be further programmed to power a third wheel while braking the first wheel and powering the second wheel. The controller may be further programmed to subsequently release the brake of the first wheel, and brake a third wheel while powering the first wheel. The controller may be further programmed to subsequently release the brake of the first wheel, and brake a third wheel while powering a fourth wheel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
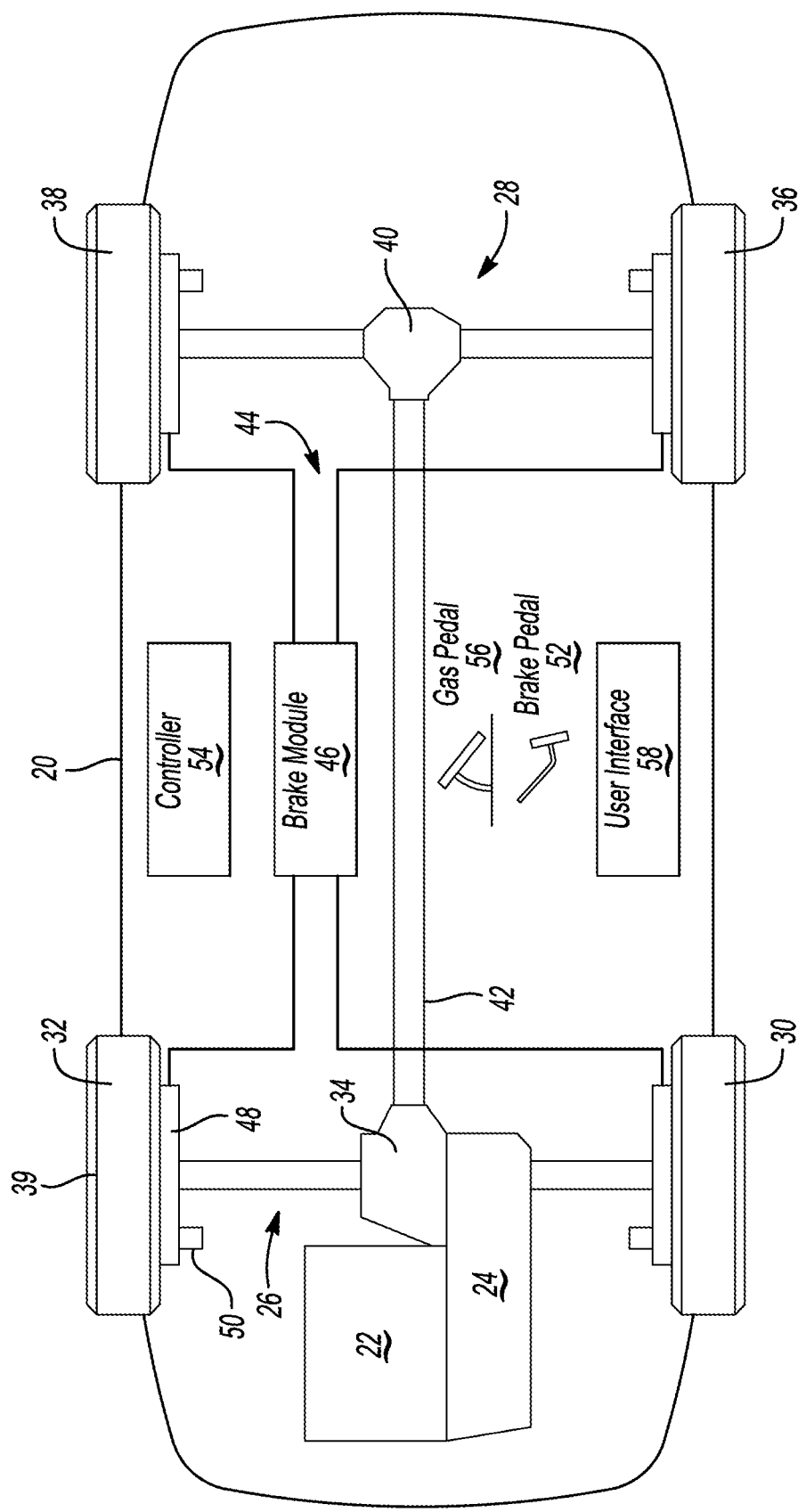
FIG. 1 is a schematic diagram of a vehicle.

Referring to FIG. 1, an all-wheel-drive vehicle 20 includes a powerplant such as an internal-combustion engine 22, an electric machine(s), or a combination of both. The engine 22 is coupled to a transmission 24 that is drivably connected with the front axle 26 and the rear axle 28 so that all four wheels of the vehicle 20 can be driven by the engine 22. The front axle 26 may include a front differential 34 coupled to the transmission 24 and left and right front wheels 30 and 32 connected with the front differential via a pair of shafts. The rear axle 28 may include a rear differential 40 connected with the right and left rear wheels 36 and 38 via a pair of shafts. Each of the wheels 30, 32, 36, and 38 support a tire 39. A driveshaft 42 may connect the rear differential 40 to the front differential 34 so that power can be transmitted to all four wheels 30, 32, 36, and 38. The wheels 30, 32, 36, and 38 are driven wheels meaning they are configured to receive power from the engine 22. This is in contrast to a rear-wheel-drive vehicle in which only the rear wheels are driven and the front wheels are non-driven meaning they are not configured to receive power.

The vehicle 20 may include an anti-lock braking system (ABS) 44. While illustrated and described as a hydraulic braking system, in other embodiments, the ABS 44 may be electronic or a combination of electronic and a hydraulic. The ABS 44 may include a brake module 46 and a plurality of friction brakes 48 located at each of the wheels. Modern vehicles typically have disc brakes; however, other types of friction brakes are available such as drum brakes. Each of the brakes 48 are in fluid communication with the brake module 46 via a brake line configured to deliver fluid pressure from the module 46 to a caliper of the brakes 48. The module 46 may include a plurality of valves configured to provide independent fluid pressure to each of the brakes 48. The module 46 is also configured to provide line lock to one or more of the brakes 48. "Line lock" refers to the ability of the module 46 to supply and hold fluid pressure to one or more of the brakes 48 independent of the brake pedal 52. The ABS system 44 also includes speed sensors 50 each located on one of the wheels.

The brake module 46 may be controlled by operation of the brake pedal 52 and/or by a vehicle controller 54 without input from the driver. The controller 54 may be a vehicle-based computing system that includes one or more controllers that communicate via a serial bus (e.g., controller area network (CAN)) or via dedicated electrical conduits. The controller 54 generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers. An example of a vehicle-based computing system is the SYNC system manufactured by THE FORD MOTOR COMPANY. The controller 54 may include an engine control module (ECM) that operates at least the engine, a powertrain control module (PCM) that operates at least the transmission, and an ABS control module that controls the ABS 44.

An accelerator pedal 56 provides operator input to control a speed of the vehicle 20. The engine 22 may have an electronically controlled throttle body. The pedal 56 may include a pedal-position sensor that provides a pedal-position signal to the controller 54, which provides control signals to the throttle body and other engine components. The controller 54 may use the pedal-position signal to determine a driver-demanded torque (also known as an engine-torque request). The driver-demanded torque may also be generated by the controller 54 independent of the pedal-position signal. Since the vehicle 20 includes an electrotonic throttle, the controller 54 may deny vehicle acceleration despite the accelerator pedal 56 being depressed.

The vehicle 20 may include one or more user interfaces 58 that allow the vehicle 20 and the driver to communicate with each other. The user interface 58 is in electronic communication with the controller 54. The user interface 58 may include one or more displays, such as a touchscreen display, buttons, switches, toggles, a microphone, speakers, and the like. Using the user interface 58 the driver may request line-lock mode. The user interface 58 may include one or more screens associated with line-lock mode allowing the driver to make selections associated with line-lock mode and display specific instructions to the driver for operating the vehicle in line-lock mode.

Unlike a front-wheel or rear-wheel drive vehicle that only has a single driven axle, all-wheel-drive-vehicles have two driven axles. Thus, locking wheels of the non-driven axle, as is traditionally done in line-lock modes for rear-wheel-drive cars, is not feasible for all-wheel-drive vehicles, such as vehicle 20. To overcome this problem, this disclosure sets forth multi-phase methods where some wheels are braked while others are spun. In one embodiment, for each driven axle, a first of the wheels is held while a second of the wheels is permitted to freely rotate to warmup, and subsequently the second wheel is held while the first wheel is permitted to freely rotate to warmup. For a four-wheeled vehicle, this method may be accomplished in two phases.

Control logic or functions performed by controller 54 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 54. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2A:
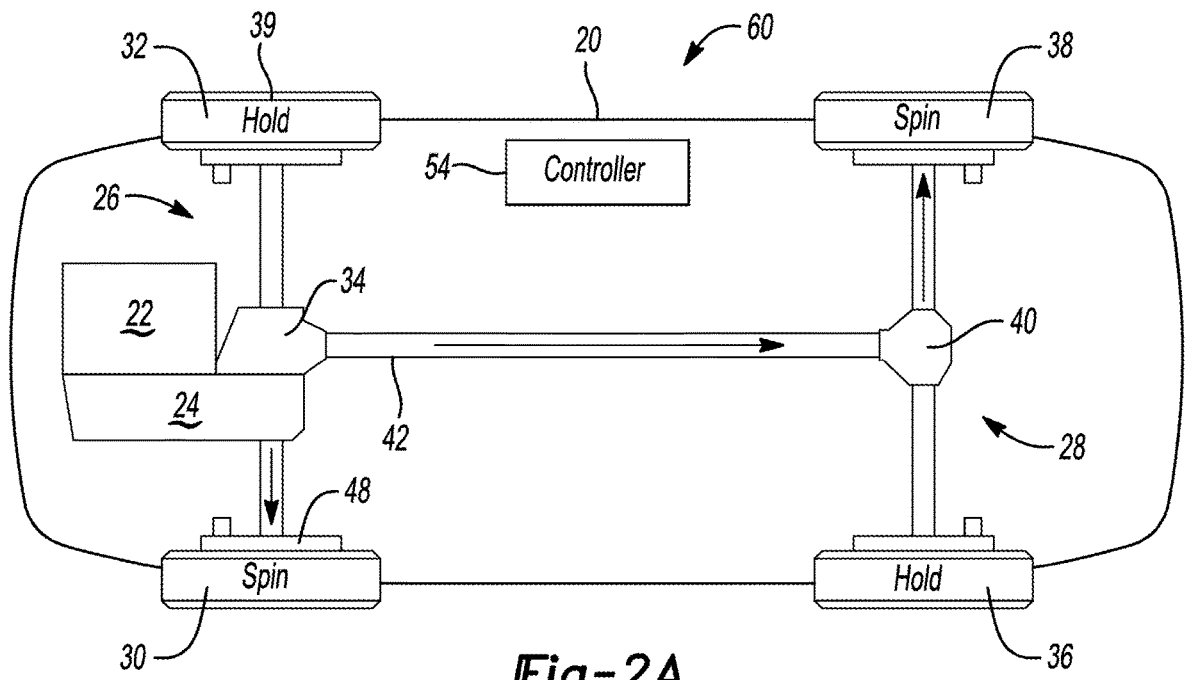
FIG. 2A is a schematic diagram of the vehicle during a first phase of a line-lock mode in which the front-left wheel and the rear-right wheel are spun.
Figure 2B:
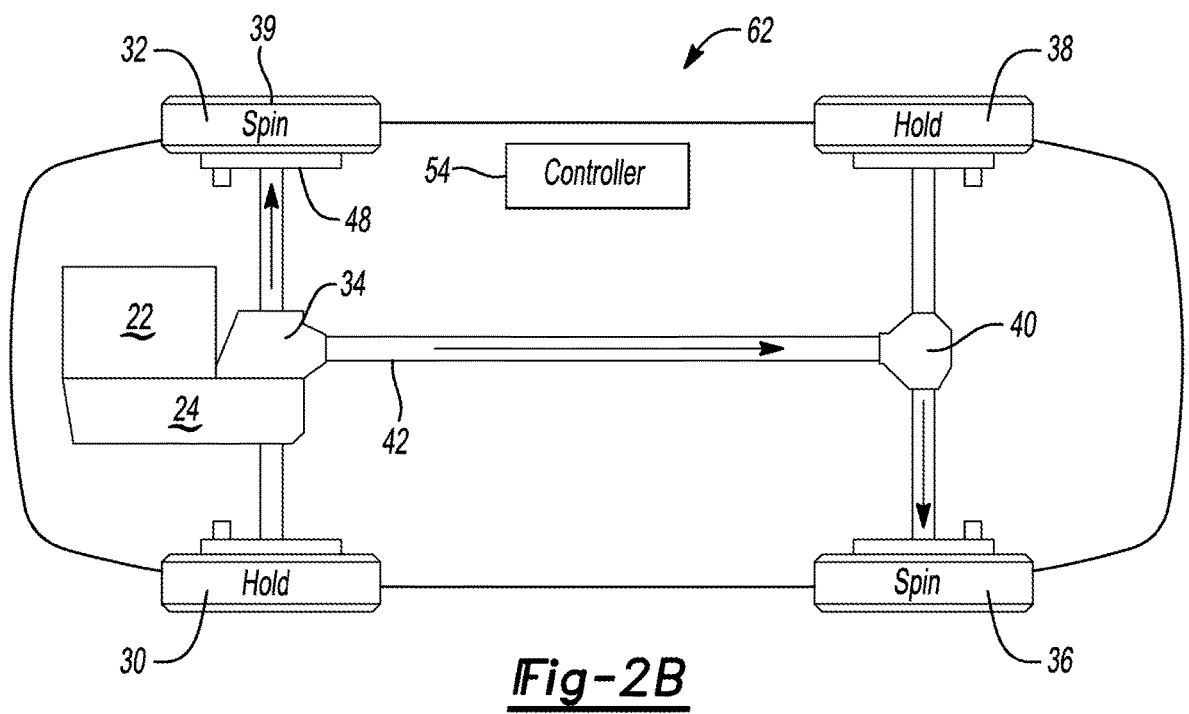
FIG. 2B is a schematic diagram of the vehicle during a second phase of the line-lock mode in which the front-right wheel and the rear-left wheel are spun.
Figure 3:
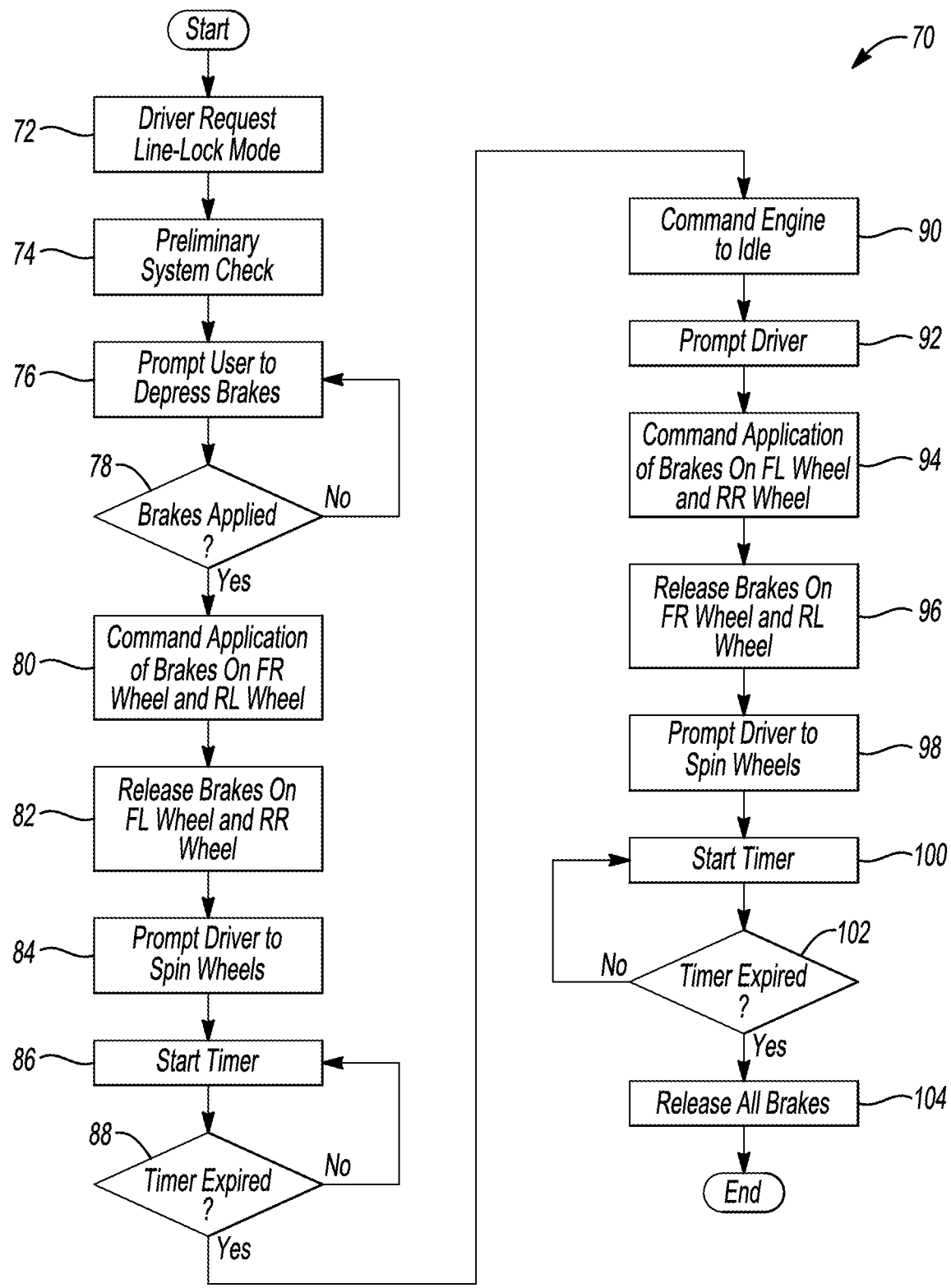
FIG. 3 is a flow chart illustrating an algorithm for executing the line-lock mode.

FIGS. 2A, 2B, and 3 illustrate a first method 70 of line-lock mode in which the controller 54 brakes a first of the front wheels and a first of the rear wheels while powering a second of the front wheels and a second of the rear wheels to warm those two tires during a first phase 60, and subsequently brakes the second front wheel and the second rear wheel while powering the first front wheel and the first rear wheel to warm the other two tires during a second phase 62.

The method begins at operation 72 when the driver requests line lock mode. The driver may request line lock mode using the interface 58. For example, the driver may toggle through one or more menus and select line-lock mode using a touchscreen or buttons. The vehicle performs a preliminary system check at operation 74 to ensure the vehicle is in a proper state for performing line lock mode. The preliminary system check may include determining that the vehicle speed is zero, that steering angle is below threshold, that checking fault conditions are not present, that the transmission is in proper range, that traction control is in proper setting, and others. If the vehicle passes the preliminary system check at operation 74, control passes to operation 76 and the controller prompts the driver to depress the brake pedal 52 via the user interface 58. If the brakes are applied at operation 78, control passes to operation 80 and the controller commands application of the brakes on the front-right wheel 32 and the rear-left wheel 36, i.e., the brakes on wheels 32 and 36 are line locked. At operation 82 the controller commands release of the brakes on the front-left wheel 30 and the rear-right wheel 38 so that these wheels can be spun to warm-up the tires 39.

At operation 84 the controller prompts the driver to spin the wheels by depressing the accelerator pedal 56 as desired. Depressing the accelerator pedal 56 will produce engine power that is routed to the front and rear differentials 34, 40. Assuming that the front differential 34 and the rear differential 40 are open differentials, engine power will freely flow to the released wheels 30 and 38 causing spinning ("burnout"), which warms the tires 39. Alternatively, the controller 54 could carry out spinning of the wheels without input from the driver.

The vehicle may limit the amount of time or wheel rotations permitted during line-lock mode. In one embodiment, the driver is permitted to spin the wheels for a predetermined amount of time such 5 to 60 seconds. A timer may be started operation 86 and monitored at operation 88. Alternatively, line lock mode may be limited to a certain number of wheel revolutions. The controller may count revolutions using the wheels sensors 50.

Once the timer expires (or wheel revolutions exceeds a threshold) control passes operation 90 and the controller commands the engine to idle to prevent further wheel spinning irrespective of accelerator pedal position. A prompt may be issued to the driver at operation 92 indicating that wheel spinning for wheels 30 and 38 is complete and requesting the driver to release the accelerator pedal 56. At this point, two of the four driven wheels have been warmed and a first phase of the method 70 has been complete.

A second phase will now commence to warm wheels 32 and 36. At operation 94 the controller commands application of the brakes on the front-left wheel 30 and the rear-right wheel 38. At operation 96 controller commands release of the brakes on the front-right wheel 32 and the rear-left wheel 36 so that these tires 39 can be warmed. At operation 98 the drivers prompted to spin the wheels by depressing the accelerator pedal 56. At operation 100 to timer is started and at operation 102 the timer is monitored. Control passes operation 104 when the timer has expired. At operation 100 all brakes may be released allowing the vehicle to travel forward and line-lock mode is ended.

While not illustrated in the flowchart, the vehicle may continuously monitor vehicle conditions during line lock mode and exit line lock mode if any of the conditions failed to be met. For example, line-lock mode may be aborted if brake-fluid pressure drops below a threshold, the brake pedal 52 is pressed, the vehicle rotates beyond a threshold angle, tire pressure drops below a threshold pressure, and the like.

Figure 4A:
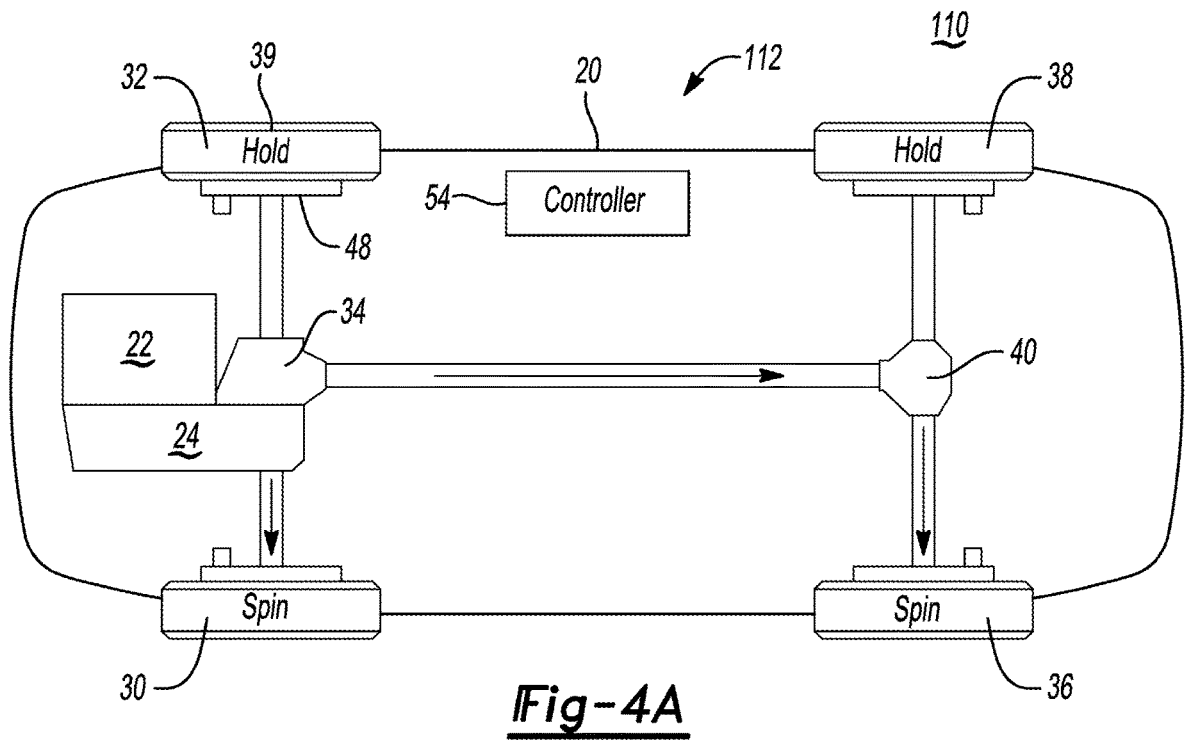
FIG. 4A is a schematic diagram of the vehicle during a first phase of another line-lock mode in which the front-left wheel and the rear-left wheel are spun.
Figure 4B:
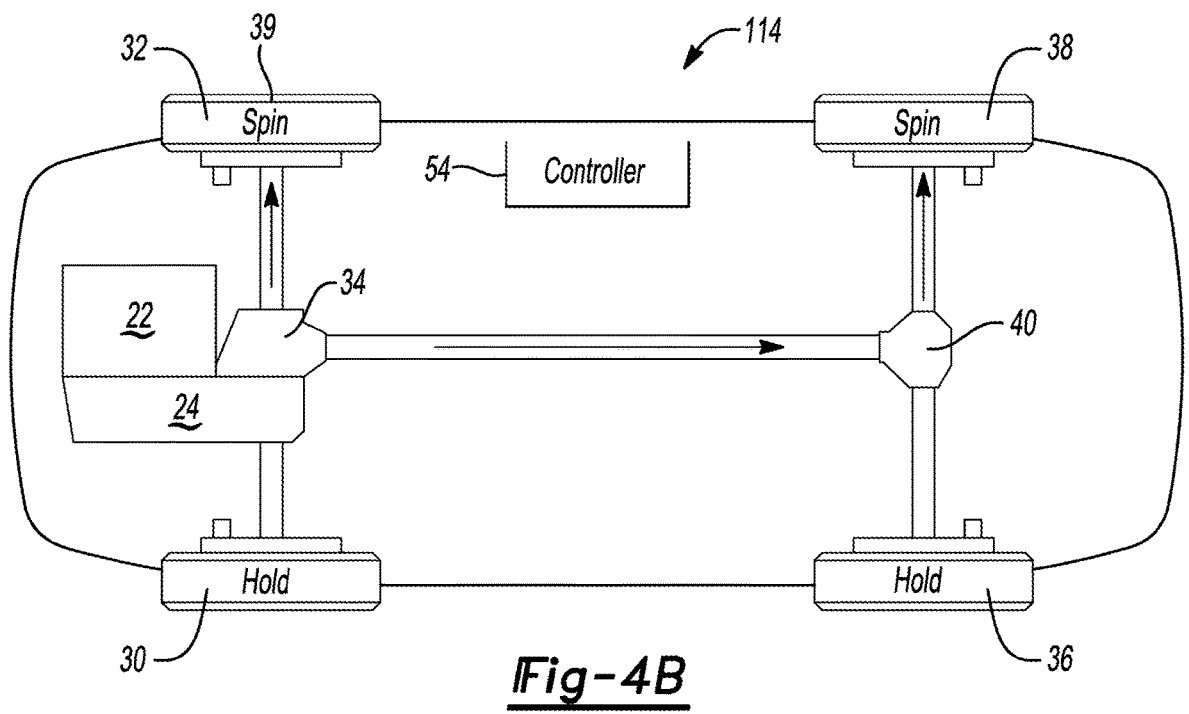
FIG. 4B is a schematic diagram of the vehicle during a second phase of the another line-lock mode in which the front-right wheel and the rear-right wheel are spun.

FIGS. 4A and 4B illustrate a method 110 that is similar to method 70 but spins and holds wheels on a same side of the vehicle rather than diagonally as described in method 70. During the first phase 112 the front-right wheel 32 and the rear-right wheel 38 are held stationary by the brakes, i.e., line locked, and the front-left wheel 30 and the rear-left wheel 36 are permitted to spin to warm up the tires 39. During the second phase 114, the front-left wheel 30 and the rear-left wheel 36 are held stationary by the brakes, i.e., line locked, and the front-right wheel 32 and the rear-right wheel 38 are permitted to spin to warm up the tires.

While the above embodiments describe braking two wheels and spinning two wheels during each phase, this disclosure is not limited to this. In other embodiments, a single wheel may be braked during each phase and/or a single wheel may be spun during each phase. The number of phases is also not limited to two. For example, a four-phase method may be used in which a single tire is spun during each phase. Furthermore, all driven wheels need not be warmed in all embodiments; although this may result in decreased traction compared to embodiments that warm all of the driven wheels. An example of this may include only preforming the first phase 60 of the above described two-phase embodiment of FIGS. 2A and 2B.

Figure 5A:
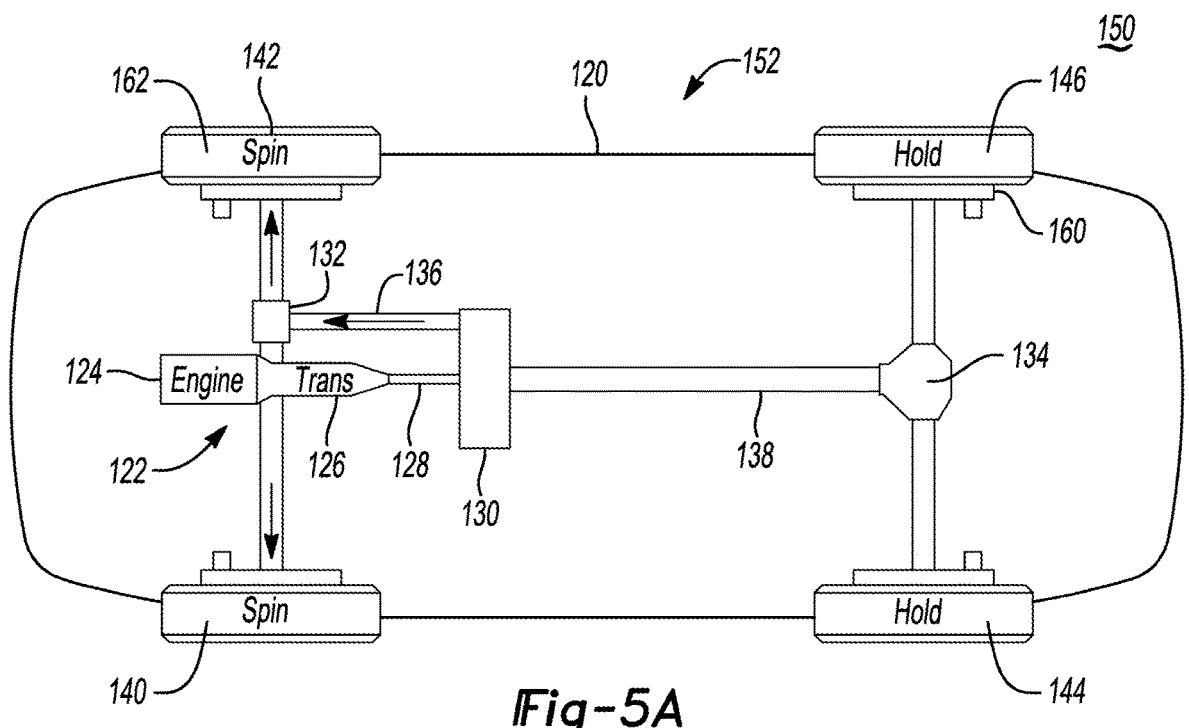
FIG. 5A is a schematic diagram of another vehicle during a first phase of a line-lock mode in which the front left and right wheels are spun.
Figure 5B:
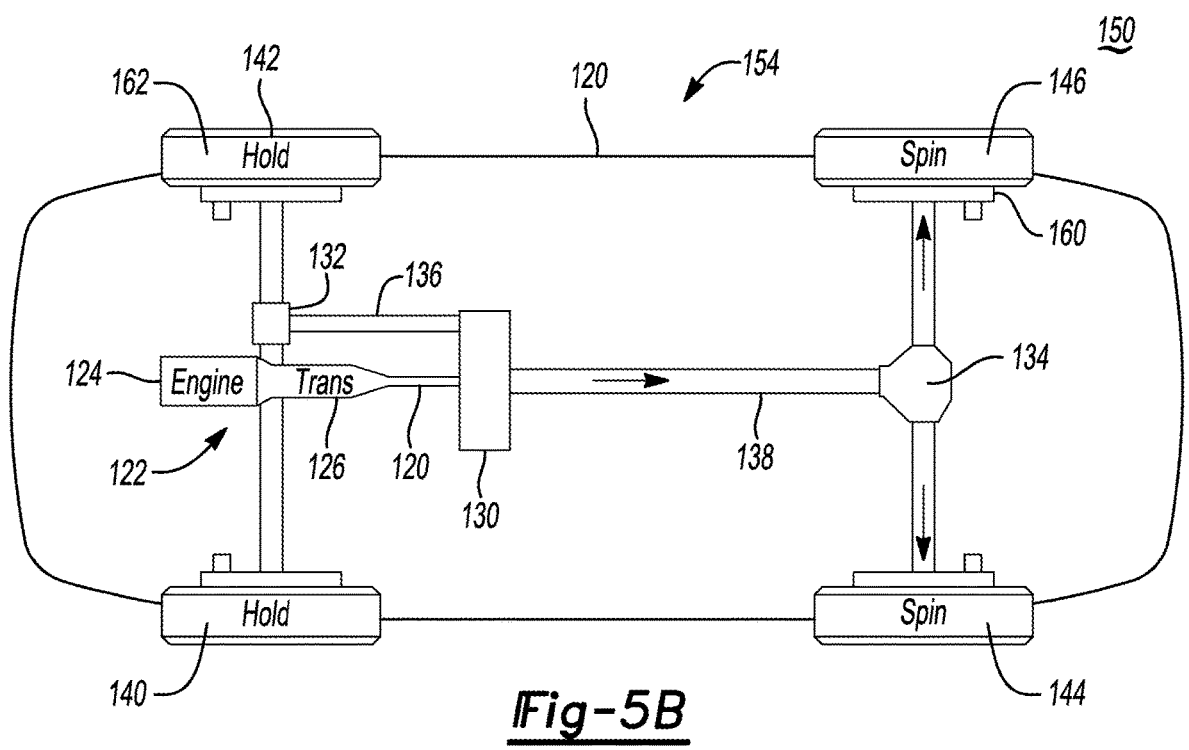
FIG. 5B is a schematic diagram of the another vehicle during a second phase of the line-lock mode in which the rear left and right wheels are spun.
Figure 6B:
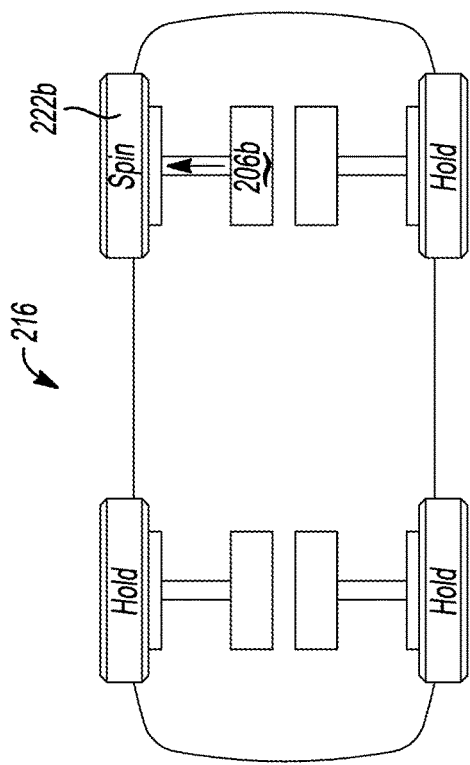
FIG. 6B is a schematic diagram of the yet another vehicle during a second phase of the line-lock mode in which the rear-right wheel is spun.
Figure 6D:
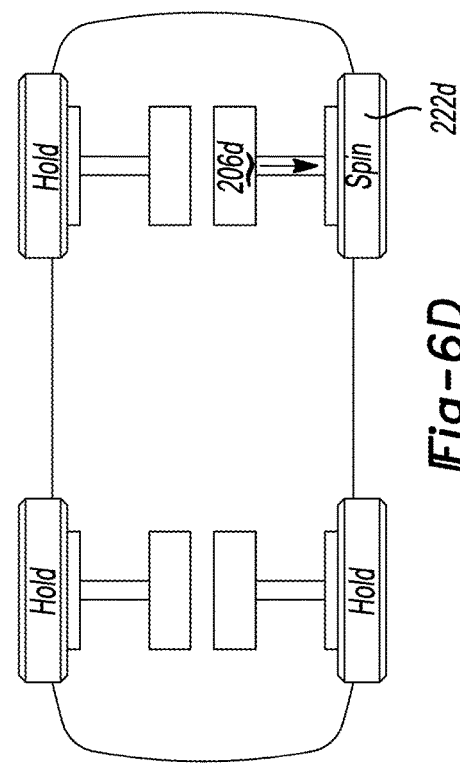
FIG. 6D is a schematic diagram of the yet another vehicle during a fourth phase of the line-lock mode in which the rear-left wheel is spun.
Figure 6A:
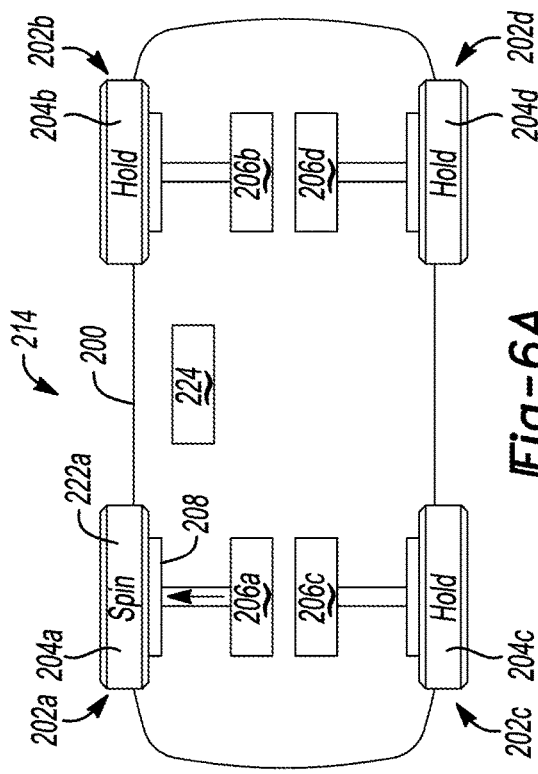
FIG. 6A is a schematic diagram of the yet another vehicle during a first phase of a line-lock mode in which the front-right wheel is spun.
Figure 6C:
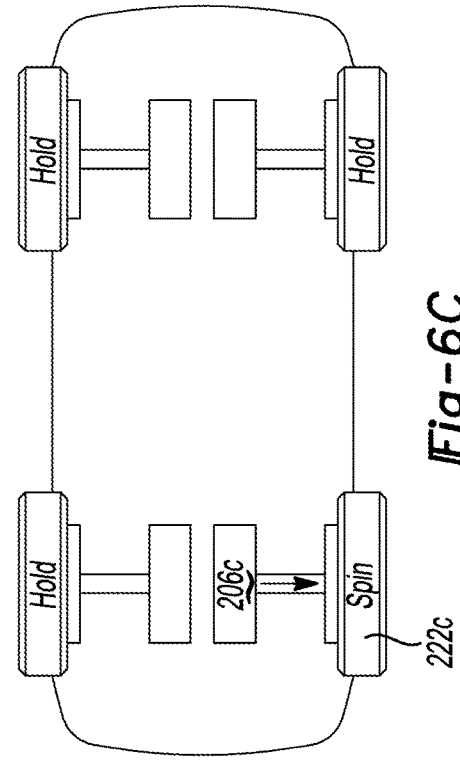
FIG. 6C is a schematic diagram of the yet another vehicle during a third phase of the line-lock mode in which the front-left wheel is spun.

Referring to FIGS. 5A and 5B, another vehicle 120 includes a longitudinally mounted powertrain 122. The powertrain 122 includes an engine 124 and a transmission 126. A first shaft 128 couples the output shaft of the transmission 126 two a center differential. The center differential 130 is configured to supply power to the front differential 132, the rear differential 134, or both. A forward driveshaft 136 connects the front differential 132 to the center differential 130, and a rear driveshaft 138 connects the rear differential 134 to the center differential 130. The left and right front wheels 140, 142 are drivably connected to the front differential 132, and the left and right rear wheels 144, 146 are drivably connected to the rear differential 134.

FIGS. 5A and 5B illustrate method 150 for warming up the tires of an all-wheel drive vehicle that includes a center differential. During a first phase 152, the center differential 130 is actuated so that power produced by the engine 124 is sent to the front differential 132 but not to the rear differential 134. The brakes 160 of the rear wheels 144, 146 are applied, i.e., line locked, and the brakes 160 of the front wheels 140, 142 are not applied. This allows the front wheels 140, 142 to rotate warming up the tires 162. During a second phase 154, the center differential 130 is actuated so that power produced by the engine 124 is sent to the rear differential 134 but not to the front differential 132. The brakes 160 of the front wheels 140, 142 are applied, i.e., line locked, and the brakes 160 of the rear wheels 144, 146 are not applied. This allows the rear wheels 144, 146 to rotate warming up the tires 162.

Control similar to that described above and illustrated in FIG. 3 may be used to operate line-lock mode of the vehicle 120. The controls for the vehicle 120 may further include steps for operating the center differential 130. The center differential 130 may include actuatable clutches, servo motors, or other devices that allow power to flow from the center differential 130 to the front differential 132, the rear differential 134, or both.

Referring to FIGS. 6A to 6D, an electric vehicle 200 may be all-wheel-drive and include an electric machine dedicated to each wheel. For example, the vehicle 200 may include wheel assemblies 202a-d that each have a wheel 204a-d driven by an associated electric machine 206a-d. The electric machines 206 may be disposed within a hub of the wheel despite being schematically illustrated as separate from the wheel assembly. The vehicle 200 may also include an ABS similar to ABS 44. The ABS includes a friction brake 208 at each wheel. The friction brakes 208 may be disc-brake assemblies. Driving each wheel with an associated motor enables each wheel to be driven separately, which may be advantageous during line-lock mode. A line-lock mode of vehicle 200 could include two phases in which two of the wheels are spun and two the wheels are line locked (as described above), or may include four phases in which only one wheel is spun at a time while the other three wheels are line locked. Spinning each wheel separately may provide additional stability during line-lock mode.

FIGS. 6A to 6D illustrate a four-phase line-lock mode in which only one wheel is spun at a time. In the first phase 214, the controller 224 commands application of the brakes 208 on the wheels 204b-d and commands the electric machine 206a to spin wheel 204a according to a position of the accelerator pedal.

Once the tire 222a on wheel 204a is warmed up, a second phase 216 begins in which the controller 224 commands application of the brakes on wheels 204a, c, d and releases the brake 208 on wheel 204b. The controller 224 commands the electric machine 206b to spin wheel 204b according to a position of the accelerator pedal.

Once the tire 222b on wheel 204b is warmed up, a third phase 218 begins in which the controller 224 commands application of the brakes on wheels 204a, b, d and releases the brake 208 on wheel 204c. The controller 224 commands the electric machine 206c to spin wheel 204c according to a position of the accelerator pedal.

Once the tire 222c on wheel 204c is warmed up, a fourth phase 220 begins in which the controller 224 commands application of the brakes on wheels 204a-c and releases the brake 208 on wheel 204d. The controller 224 commands the electric machine 206d to spin wheel 204d according to a position of the accelerator pedal. The controller 224 may release all brakes 208 and power the electric machine normally after the tire 222d is warmed, which ends the line-lock mode. It is to be understood that the additional details illustrated in FIG. 3 and described above may be included, as applicable, in the line-lock mode of vehicle 200 and were not repeated for brevity. It is to be further understood that the four-phase method of FIGS. 6A-D can also be employed in vehicles with a conventional powertrain.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powerplant;
   front and rear wheels;
   a drivetrain arranged to selectively route power from the powerplant to the front and rear wheels; and
   a controller programmed to, responsive to line-lock mode being activated,
   i) for a first time window, brake the front wheels and actuate the drivetrain to disconnect the front wheels from the powerplant and to drivably connect the rear wheels with the powerplant, and
   ii) for a second time window that is subsequent to the first time window, brake the rear wheels and actuate the drivetrain to disconnect the rear wheels from the powerplant and to drivably connect the front wheels with the powerplant.

2. The vehicle of claim 1, wherein the drivetrain includes a center differential configured to receive power from the powerplant and selectively route the power to the front and rear wheels.

3. The vehicle of claim 1, wherein the first time window ends in response to a number of rotation of the front wheels exceeding a threshold.

4. The vehicle of claim 1, wherein the first time window ends in response to a timer exceeding a threshold.

5. The vehicle of claim 1, wherein the controller is further programmed to command powerplant torque to idle in response to the first time window expiring.

6. The vehicle of claim 1, wherein the powerplant is an engine.

7. A vehicle comprising:
   an engine;
   front and rear wheels;
   a drivetrain arranged to selectively route power from the engine to the front and rear wheels; and
   a controller programmed to, responsive to line-lock mode being activated,
   i) for a first time window, brake the front wheels and actuate the drivetrain to disconnect the front wheels from the powerplant and to drivably connect the rear wheels with the powerplant, and
   ii) for a second time window, that follows the first time window, brake the rear wheels and actuate the drivetrain to disconnect the rear wheels from the powerplant and to drivably connect the front wheels with the powerplant.

8. The vehicle of claim 7, wherein the drivetrain includes a center differential configured to receive power from the engine and selectively route the power to the front and rear wheels.

9. The vehicle of claim 7, wherein the first time window ends in response to a number of rotation of the front wheels exceeding a threshold.

10. The vehicle of claim 7, wherein the first time window ends in response to a timer exceeding a threshold.

11. The vehicle of claim 7, wherein the controller is further programmed to command engine torque to idle in response to the first time window expiring.

* * * * *